United States Patent
Park et al.

(10) Patent No.: US 9,876,619 B2
(45) Date of Patent: Jan. 23, 2018

(54) METHOD FOR SETTING REFERENCE SIGNAL IN MULTI-CELL BASED WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Kijun Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/352,259

(22) Filed: Nov. 15, 2016

(65) Prior Publication Data

US 2017/0126381 A1    May 4, 2017

Related U.S. Application Data

(63) Continuation of application No. 14/440,820, filed as application No. PCT/KR2014/002551 on Mar. 26, 2014, now Pat. No. 9,537,631.

(60) Provisional application No. 61/806,383, filed on Mar. 28, 2013, provisional application No. 61/805,528, filed on Mar. 27, 2013.

(51) Int. Cl.
*H04W 4/00*   (2009.01)
*H04L 5/00*   (2006.01)
*H04W 24/10*  (2009.01)
*H04W 88/08*  (2009.01)

(52) U.S. Cl.
CPC .......... *H04L 5/0048* (2013.01); *H04L 5/0035* (2013.01); *H04W 24/10* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2012/0155312 A1 | 6/2012 | Kim et al. | |
| 2013/0021980 A1 | 1/2013 | Yang et al. | |
| 2013/0021991 A1 | 1/2013 | Ko et al. | |
| 2013/0343301 A1* | 12/2013 | Geirhofer | H04L 5/001 370/329 |
| 2014/0022924 A1 | 1/2014 | Cili | H04W 24/08 370/252 |
| 2014/0036804 A1* | 2/2014 | Chen | H04W 72/0406 370/329 |

(Continued)

FOREIGN PATENT DOCUMENTS

| | | |
|---|---|---|
| WO | 2012096521 A2 | 7/2012 |
| WO | 2012144842 A2 | 10/2012 |

*Primary Examiner* — Minh-Trang Nguyen
(74) *Attorney, Agent, or Firm* — Dentons US LLP

(57) ABSTRACT

Disclosed is a method for transmitting and receiving a signal, by a terminal, in a wireless communication system. More particularly, the method comprises the steps of: receiving information about a plurality of reference signal resources from a base station; receiving information about one channel state information (CSI) process from the base station; and reporting CSI on the basis of the information about the one CSI process, wherein the information about the one CSI process comprises information indicative of at least one of the plurality of reference signal resources.

8 Claims, 12 Drawing Sheets

(56) References Cited

U.S. PATENT DOCUMENTS

2014/0044061 A1      2/2014  Yue ................... H04W 72/042
                                                      370/329
2014/0177683 A1*     6/2014  Krishnamurthy .... H04B 7/0469
                                                      375/219

* cited by examiner

Control-Plane Protocol Stack

User-Plane Protocol Stack

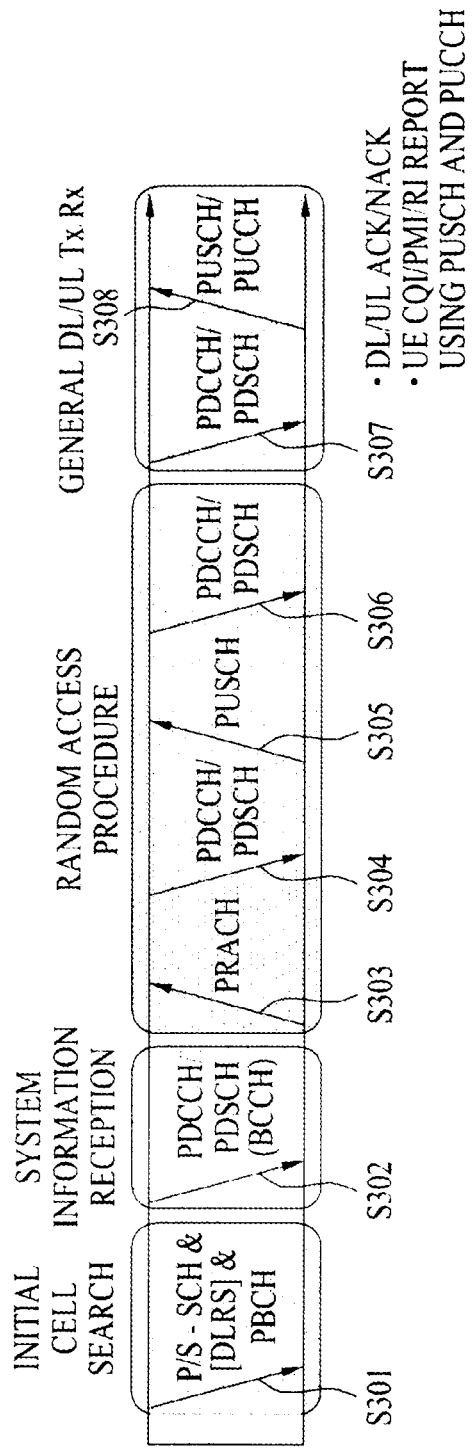

☐ : DMRS GROUP 1

☐ : DMRS GROUP 2

METHOD FOR SETTING REFERENCE SIGNAL IN MULTI-CELL BASED WIRELESS COMMUNICATION SYSTEM AND APPARATUS THEREFOR

This application is a continuation of, and claims priority to, U.S. patent application Ser. No. 14/440,820 filed May 5, 2015, which is a National Stage Entry of International Application No. PCT/KR2014/002551 filed Mar. 26, 2014, and claims priority to U.S. Provisional Application Nos. 61/806,383 filed Mar. 28, 2013 and 61/805,528 filed Mar. 27, 2013, all of which are hereby incorporated by reference in their entireties as if fully set forth herein.

TECHNICAL FIELD

The present invention relates to a wireless communication system, and more particularly, to a method and apparatus for setting a reference signal in a multi-cell based wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power.

DISCLOSURE

Technical Problem

An object of the present invention devised to solve the problem lies in a method and apparatus for setting a reference signal in a multi-cell based wireless communication system.

Technical Solution

The object of the present invention can be achieved by providing a method of transmitting and receiving a signal by a user equipment (UE) in a wireless communication system, the method including receiving information about a plurality of reference signal resources from a base station (BS), receiving information about one channel status information (CSI) process from the BS, and reporting CSI based on the information about the one CSI process, wherein the information about the one CSI process includes information indicating at least one of the plurality of reference signal resources.

In another aspect of the present invention, provided herein is a user equipment (UE) apparatus in a wireless communication system, the UE apparatus including a wireless communication module for transmitting and receiving a signal to and from a base station (BS), and a processor for processing the signal, wherein the processor controls the wireless communication module to receive information about a plurality of reference signal resources and information about one channel status information (CSI) process from the BS and to report channel status information (CSI) based on the information about the one CSI process, and the information about the one CSI process includes information indicating at least one of the plurality of reference signal resources.

According to the above embodiments of the present invention, the plurality of reference signal resources may correspond to different transmission points, respectively. In addition, large-scale properties may be continuously tracked with respect to each of the plurality of reference signal resources.

The information about the one CSI process may include information about at least two reference signal resources among the plurality of reference signal resources, and the at least two reference signal resources may be assumed to have the same large-scale properties.

The large-scale properties may include at least one of Doppler spread, Doppler shift, average delay, and delay spread.

The CSI may include sub CSIs for the at least two reference signal resources, and each of the sub CSIs may include the same rank indicator. In this case, the CSI may include information for combining the sub CSIs.

Advantageous Effects

According to an embodiment of the present invention, a user equipment (UE) may more effectively transmit and receive a signal in a multi-cell based wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 3 is a diagram for explaining physical channels used for 3GPP system and a general signal transmission method using the physical channels;

BEST MODE

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

And, in the present specification, a base station can be named by such a comprehensive terminology as an RRH (remote radio head), an eNB, a TP (transmission point), an RP (reception point), a relay and the like.

Figure 1:
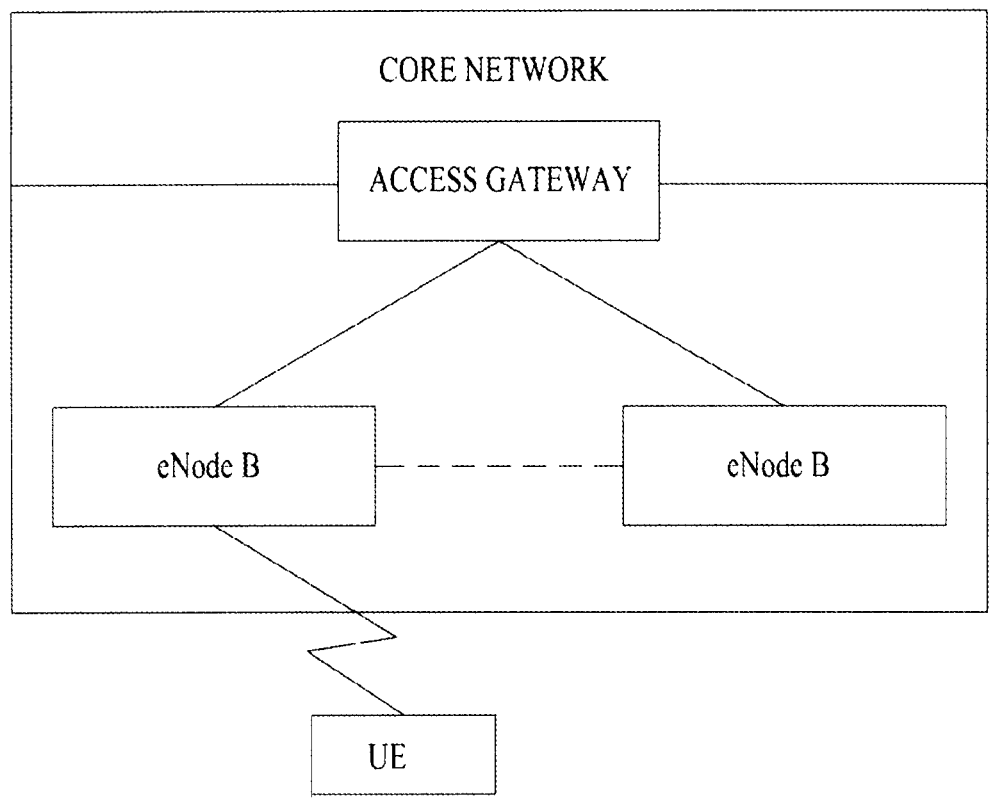
FIG. 1 is a schematic diagram of E-UMTS network structure as one example of a wireless communication system.
Figure 2A:
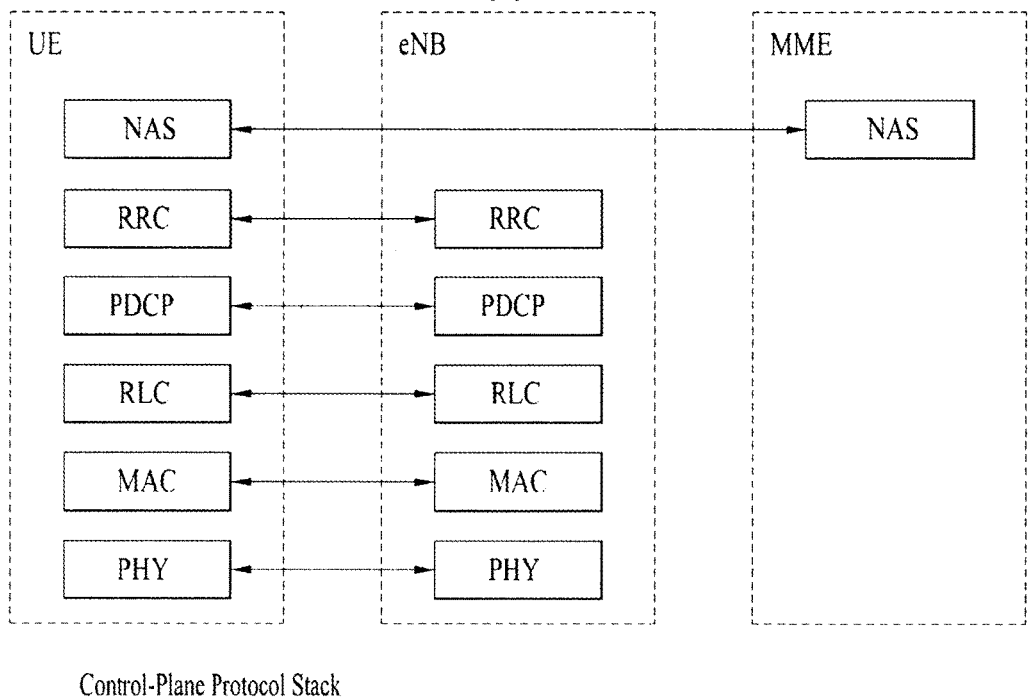
FIG. 2(*a*)-(*b*) are diagrams for structures of control and user planes of radio interface protocol between a 3GPP radio access network standard-based user equipment and E-UTRAN.
Figure 2B:
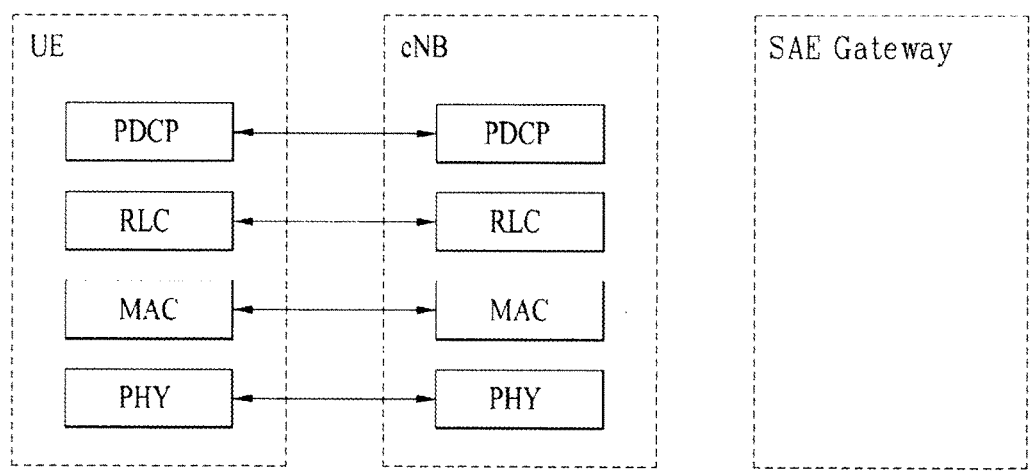

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
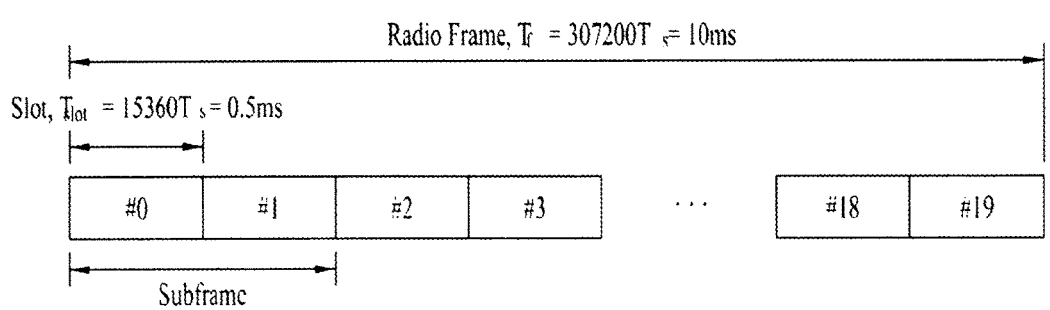
FIG. 4 is a diagram for a structure of a radio frame in LTE system.

FIG. 4 is a diagram for a structure of a radio frame in LTE system.

Referring to FIG. 4, one radio frame has a length of 10 ms ($327,200 \times T_s$) and is constructed with 10 subframes in equal size. Each of the subframes has a length of 1 ms and is constructed with two slots. Each of the slots has a length of 0.5 ms ($15,360 \times T_s$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
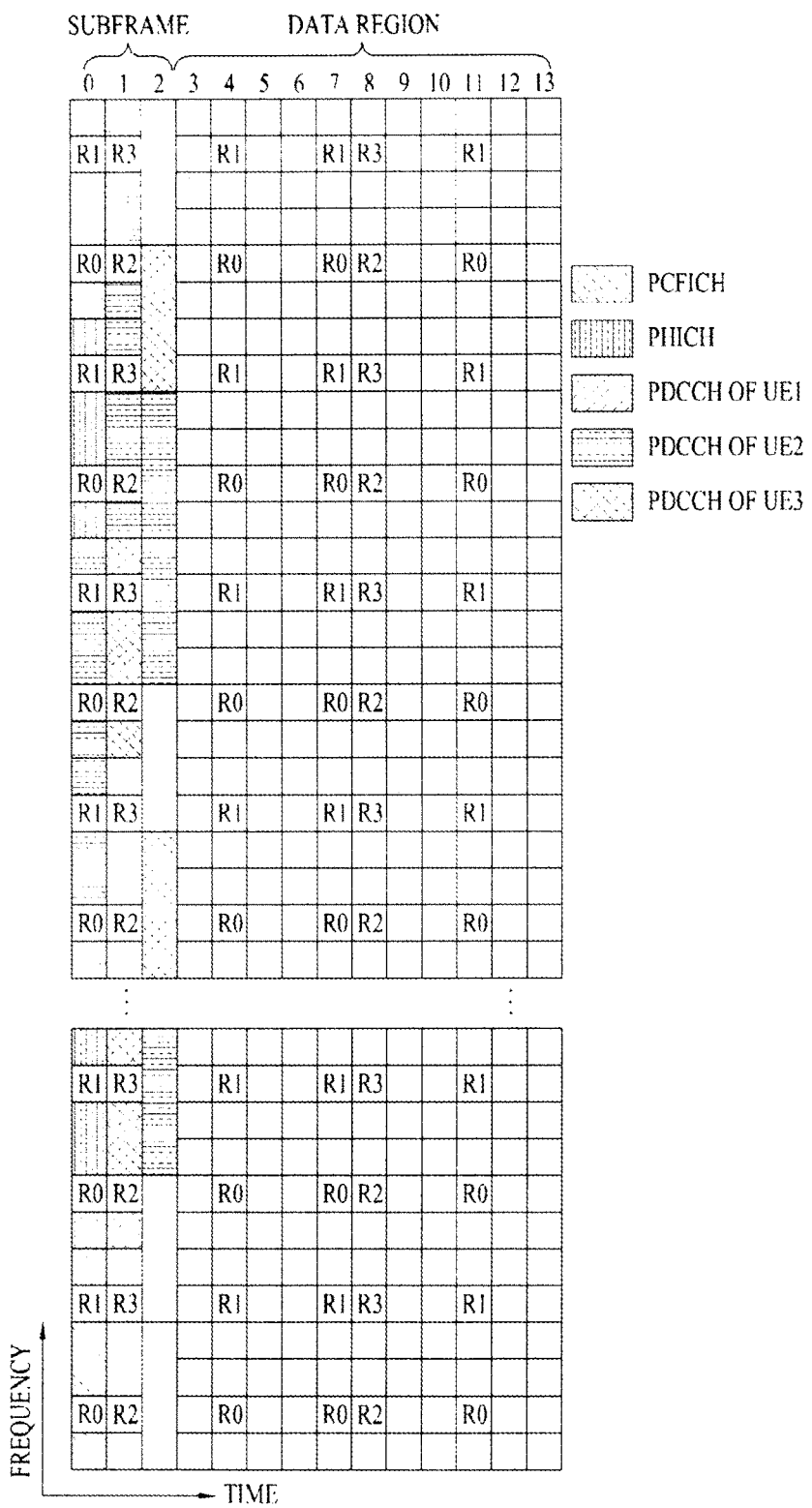
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS) or a pilot signal for an antenna 0 to 3. The RS is fixed as a constant pattern in the subframe irrespective of the control region and the data region. The control channel is assigned to a resource to which the RS is not assigned in the control region and a traffic channel is also assigned to a resource to which the RS is not assigned in the data region. The control channel assigned to the control region may include a physical control format indicator channel (PCFICH), a physical hybrid-ARQ indicator channel (PHICH), a physical downlink control channel (PDCCH), and the like.

The PCFICH (physical control format indicator channel) informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH (physical HARQ (hybrid-automatic repeat and request) indicator channel) is used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH (physical DL control channel) is assigned to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on a user equipment (one or a plurality of user equipments) receiving data of PDSCH, a method of receiving and decoding the PDSCH data performed by the user equipment, and the like is transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transport block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

Figure 6:
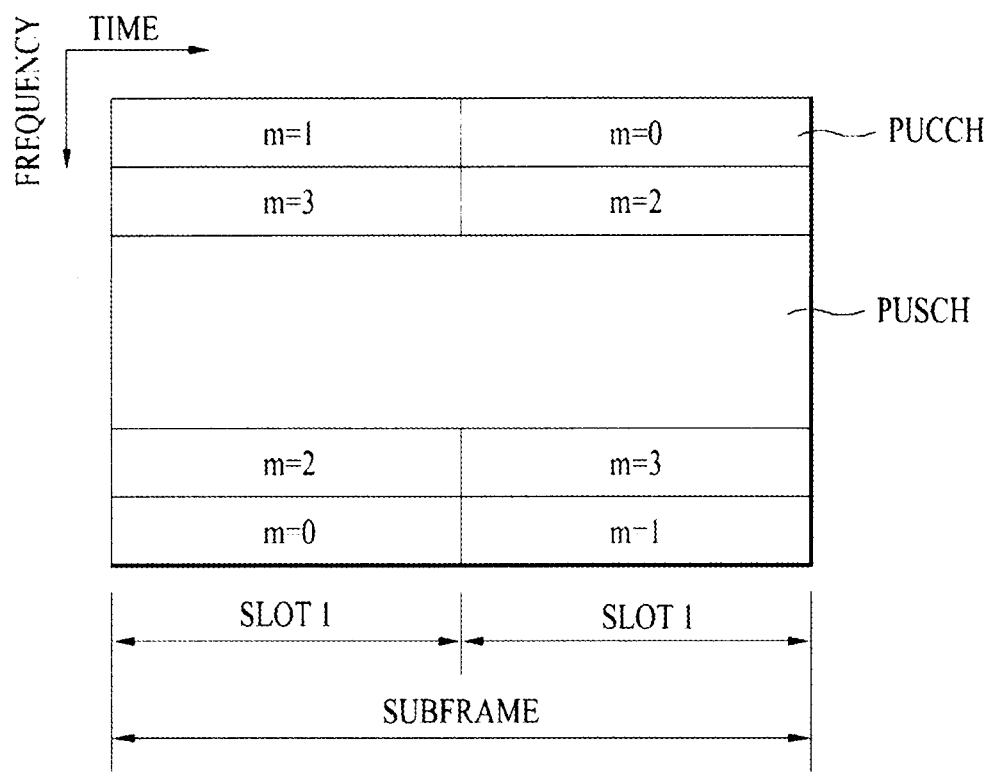
FIG. 6 is a diagram for a structure of an uplink radio frame in LTE system.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource allocation request, and the like. The PUCCH for a single UE uses one resource block, which occupies a frequency different from each other in each slot within a subframe. In particular, 2 resource blocks assigned to the PUCCH are frequency hopped on a slot boundary. In particular, FIG. 6 shows an example that the PUCCHs satisfying conditions (e.g., m=0, 1, 2, 3) are assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
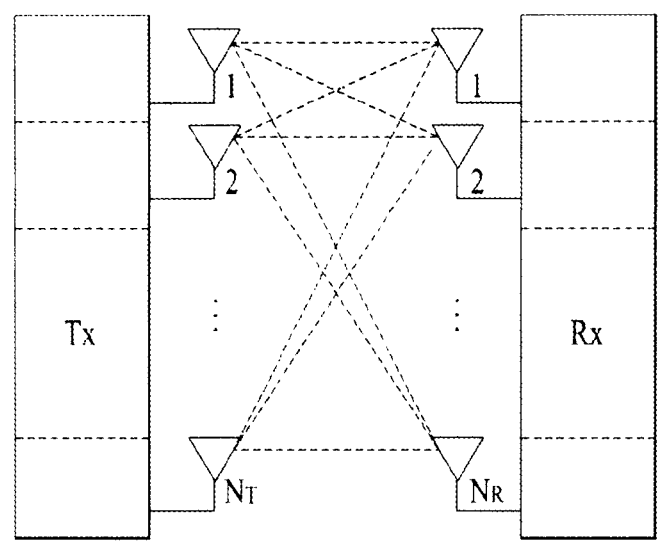
FIG. 7 is a diagram for a configuration of a multiple antenna communication system.

A block diagram of a general multi-antenna (MIMO) communication system is depicted in FIG. 7.

$N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Equation 1. In this case, the $R_i$ is a smaller value of the $N_T$ and the $N_R$.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$s = [s_1, s_2, \ldots, s_{N_T}]^t \qquad \text{[Equation 2]}$$

Meanwhile, for each of the transmission informations $s_1, s_2, \ldots, s_{N_T}$, a transmit power may be differentiated according to the each of the transmission informations. In this case, if each of the transmit powers is represented as $P_1$, $P_2$, ..., $P_{N_T}$, transmit power-adjusted transmission information can be represented as a vector in the following Equation 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

And, if ŝ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, let's consider a case that the NT number of transmission signal $x_1, x_2, \ldots, x_{N_T}$, which is practically transmitted, is configured in a manner of applying a weighted matrix W to the adjusted information vector ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an ith transmitting antenna and jth information. The W is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \quad \text{[Equation 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Equation 7 in the following.

$$\text{\# of streams} \leq \text{rank}(H) \leq \min(N_T, N_T) \quad \text{[Equation 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP jointprocessing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, an example for a transmission mode of a downlink data channel is described. Currently, 3GPP LTE standard document, specifically, 3GPP TS 36. 213 document defines a transmission mode of a downlink data channel as shown in Table 1 in the following. The transmission mode is set to a user equipment via an upper layer signaling, i.e., RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |

TABLE 1-continued

| Transmission mode | DCI format | Transmission scheme of PDSCH corresponding to PDCCH |
|---|---|---|
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
|  | DCI format 1 | Single-antenna port, port 5 |
| Mode 8 | DCI format 1A | If the number of PBCH antenna ports is one, Single-antenna port, port 0 is used, otherwise Transmit diversity |
|  | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
|  | DCI format 2D | Up to 8 layer transmission, ports 7-14 or single-antenna port, port 7 or 8 |

Referring to Table 1, current 3GPP LTE standard document includes a downlink control information (DCI) format, which is defined according to a type of RNTI masked on PDCCH. In particular, in case of a C-RNTI and an SPS C-RNTI, a transmission mode and a DCI format corresponding to the transmission mode (i.e., a transmission mode-based DCI format) are included in the document. And, a DCI format 1A for a Fall-back mode, which is capable of being applied irrespective of each transmission mode, is defined in the document. Table 1 shows an example of a case that a type of RNTI masked on PDCCH corresponds to a C-RNTI.

In Table 1, a transmission mode 10 indicates a downlink data channel transmission mode of the aforementioned CoMP transmission method. For instance, referring to Table 1, if a user equipment performs a blind decoding on PDCCH masked with C-RNTI and then detects a DCI format 2D, the user equipment decodes PDSCH in an assumption that the PDSCH has been transmitted with a multi-layer transmission scheme based on antenna port 7 to 14, i.e., DM-RS. Or, the user equipment decodes PDSCH in an assumption that the PDSCH has been transmitted with a single antenna transmission scheme based on DM-RS antenna port 7 or 8.

On the contrary, if the user equipment performs blind decoding on PDCCH masked with C-RNTI and then detects a DCI format 1A, a transmission mode varies according to whether a corresponding subframe corresponds to an MBSFN subframe. For instance, if the corresponding subframe corresponds to a non-MBSFN subframe, the user equipment decodes PDSCH in an assumption that the PDSCH has been transmitted with a single antenna transmission scheme based on a CRS of an antenna port 0 or a CRS-based transmit diversity scheme. And, if the corresponding subframe corresponds to an MBSFN subframe, the user equipment decodes the PDSCH in an assumption that the PDSCH has been transmitted with a single antenna transmission based on a DM-RS of an antenna port 7.

In the following description, a reference signal is explained in more detail.

In general, a reference signal, which is already known to both a transmitting end and a receiving end, is transmitted from the transmitting end to the receiving end together with data to measure a channel. The reference signal plays not only a role of measuring a channel but also a role of making a demodulation process to be performed in a manner of informing the receiving end of a modulation scheme. The reference signal is classified into a dedicated reference signal (DRS) used for an eNB and a specific user equipment (i.e., UE-specific reference signal) and a cell-specific reference signal used for all UEs in a cell (i.e., common reference signal or cell specific RS (CRS)). The cell-specific reference signal includes a reference signal used for reporting CQI/PMI/RI to an eNB in a manner of measuring CQI/PMI/RI in a user equipment. This sort of reference signal is called a CSI-RS (channel state information-RS).

Figure 8:
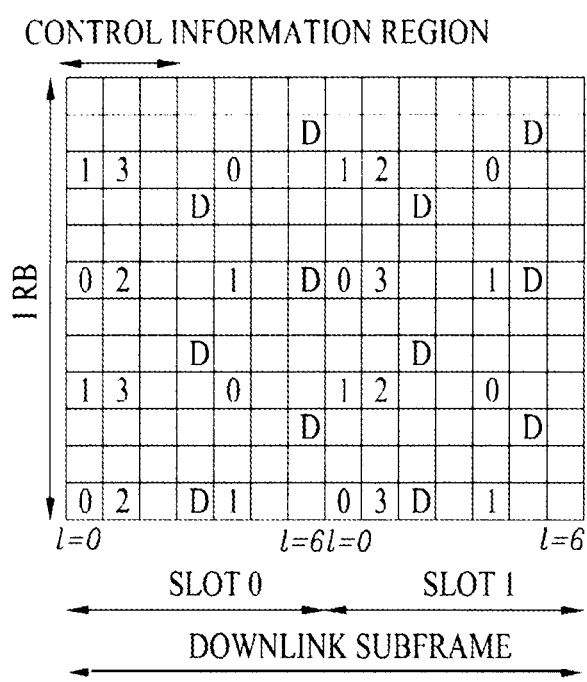
FIG. 8 and FIG. 9 are diagrams of a structure of a reference signal in LTE system supportive of downlink transmission using 4 antennas.
Figure 9:
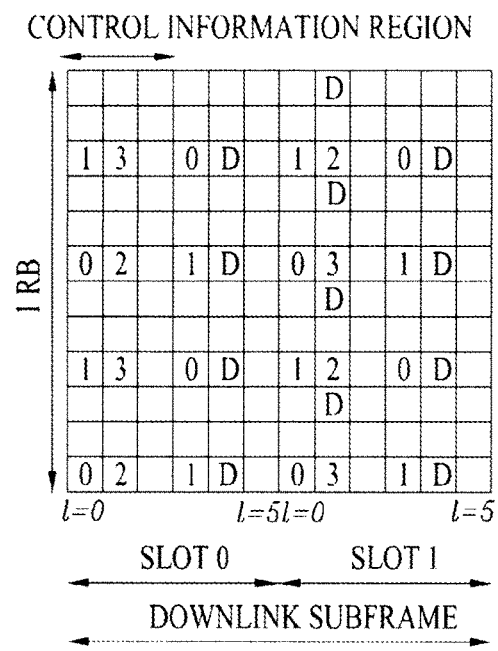

FIG. 8 and FIG. 9 are diagrams of a structure of a reference signal in LTE system supportive of downlink transmission using 4 antennas. In particular, FIG. 8 shows a case of a normal cyclic prefix and FIG. 9 shows a case of an extended cyclic prefix.

Referring to FIG. 8 and FIG. 9, 0 to 3 written on a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'ID' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 8 and FIG. 9 show an example of the DM-RS corresponding to an antenna port 5. The DM-RSs corresponding to an antenna port 7 to 14, i.e., total 8 antenna ports, are also defined by 3GPP standard document 36.211.

Figure 10:
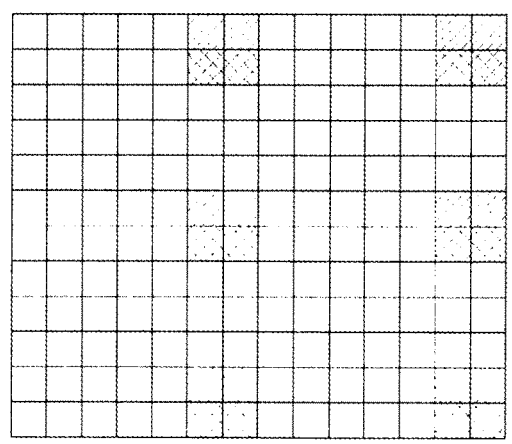
FIG. 10 is a diagram for an example of assigning a downlink DM-RS defined by a current 3GPP standard document.

FIG. 10 is a diagram for an example of assigning a downlink DM-RS defined by a current 3GPP standard document.

Referring to FIG. 10, DM-RSs corresponding to antenna ports {7, 8, 11, 13} are mapped to a DM-RS group 1 using a sequence according to an antenna port and DM-RSs corresponding to antenna ports {9, 10, 12, 14} are mapped to a DM-RS group 2 using a sequence according to an antenna port as well.

Meanwhile, the aforementioned CSI-RS is proposed to perform channel measurement for PDSCH irrespective of a CRS. Unlike the CRS, the CSI-RS can be defined by maximum 32 resource configurations different from each other to reduce inter-cell interference (ICI) in a multicell environment.

CSI-RS (resource) configuration varies according to the number of antenna ports. A CSI-RS is configured to be transmitted by different (resource) configurations between neighboring cells. Unlike the CRS, the CSI-RS supports maximum 8 antenna ports. According to 3GPP standard document, total 8 antenna ports (antenna port 15 to antenna port 22) are assigned as the antenna port for the CSI-RS. [Table 2] and [Table 3] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

| | | \multicolumn{6}{c}{Number of CSI reference signals configured} | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | | \multicolumn{6}{c}{Number of CSI reference signals configured} | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
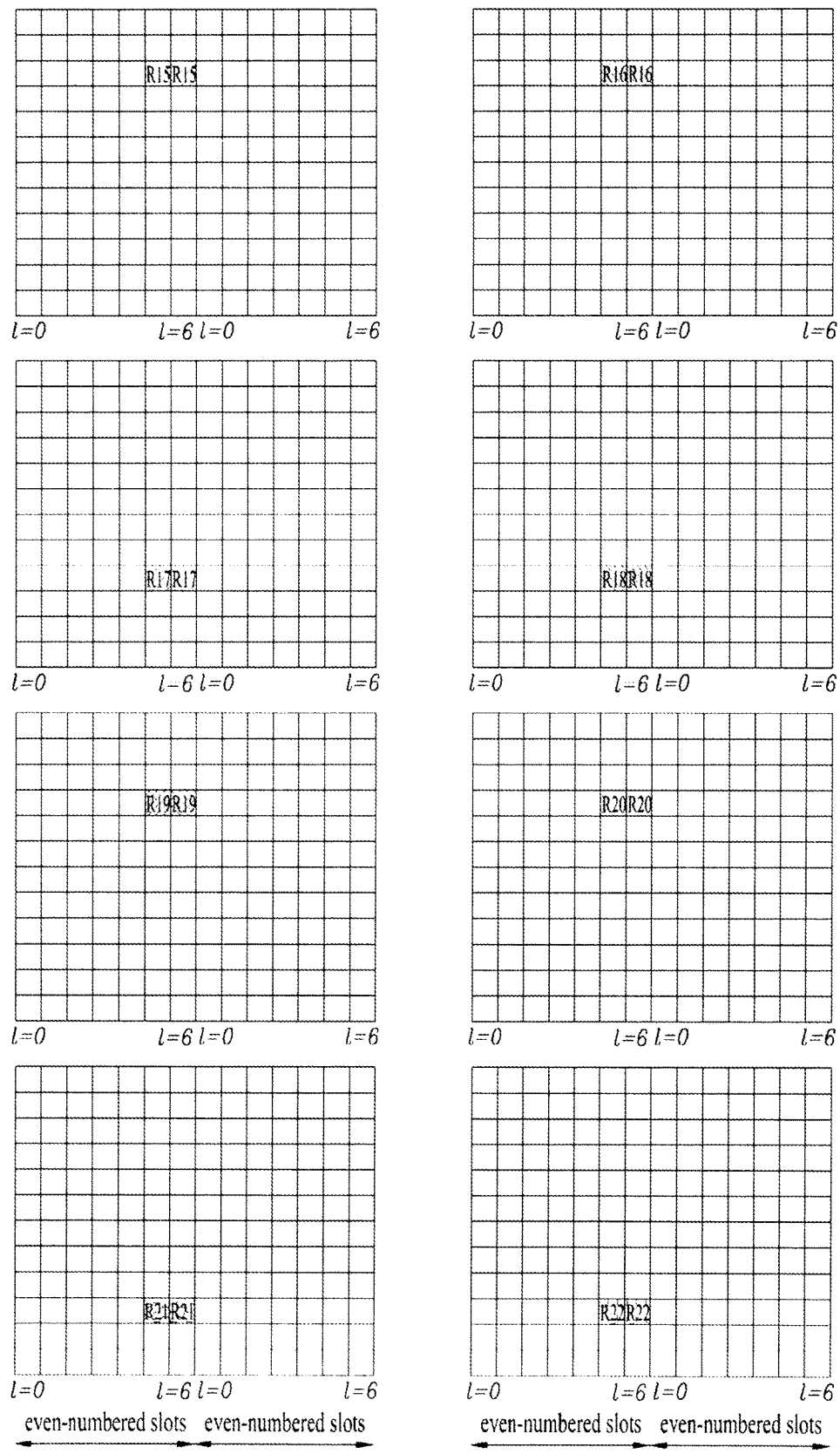
FIG. 11 is a diagram for an example of a CSI-RS configuration #0 in case of a normal CP among downlink CSI-RS configurations defined by a current 3GPP standard document.

In [Table 2] and [Table 3], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Meanwhile, information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 4]. zeroTxPowerResourceConfigList-r10 indicates a ZP CSI-RS configuration. The elements of this bitmap indicate the respective configurations written in the columns for four CSI-RS antenna ports in [Table 2] or [Table 3]. A general CSI-RS that is not the ZP CSI-RS is referred to as a non zero-power (NZP) CSI-RS.

When the aforementioned CoMP scheme is applied, a UE may be configured with a plurality of CSI-RS settings through an RRC layer signal. Each CSI-RS configuration is defined according to Table 5 below. As seen from Table 5, each CSI-RS setting contains information about CRS that can be quasi co-location (QCL) assumed.

parameter set for reception of the CoMP method of PDSCH, and detailed values of the information is pre-signaled via a higher layer. That is, for Table 6 below, four of total parameter sets may be semi-statically signaled via an RRC layer signal and a DCI format 2D of a PQI field dynamically indicates one of the four of total parameter sets.

TABLE 6

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Information included in the parameter set includes one of the number of CRS antenna ports (crs-PortsCount), a CRS frequency shift value (crs-FreqShift), MBSFN subframe configuration (mbsfn-SubframeConfigList), ZP CSI-RS configuration (csi-RS-ConfigZPId), PDSCH start symbol (pdsch-Start), NZP (Non-ZP) CSI-RS QCL (Quasi Co-Location) information, and (qcl-CSI-RS-ConfigNZPId) information.

In the following, QCL (Quasi Co-Location) between antenna ports is explained.

QCL between antenna ports indicates that all or a part of large-scale properties of a signal (or a radio channel corresponding to a corresponding antenna port) received by a user equipment from a single antenna port may be identical to large-scale properties of a signal (or a radio channel corresponding to a corresponding antenna port) received from a different single antenna port. In this case, the larger-scale properties may include Doppler spread related to frequency offset, Doppler shift, average delay related to timing offset,

TABLE 5

| CSI-RS-ConfigNZP information elements |
|---|

```
-- ASN1START
CSI-RS-ConfigNZP-r11 ::=       SEQUENCE {
    csi-RS-ConfigNZPId-r11         CSI-RS-ConfigNZPId-r11,
    antennaPortsCount-r11          ENUMERATED {an1, an2, an4, an8},
    resourceConfig-r11             INTEGER (0..31),
    subframeConfig-r11             INTEGER (0..154),
    scramblingIdentity-r11         INTEGER (0..503),
    qcl-CRS-Info-r11               SEQUENCE {
        qcl-ScramblingIdentity-r11     INTEGER (0..503),
        crs-PortsCount-r11             ENUMERATED {n1, n2, n4, spare1},
        mbsfn-SubframeConfigList-r11   CHOICE {
            release                        NULL,
            setup                          SEQUENCE {
                subframeConfigList             MBSFN-SubframeConfigList
            }
        }                                                      OPTIONAL  -- Need ON
    }                                                          OPTIONAL, -- Need OR
    ...
}
-- ASN1STOP
```

Recently, the 3GPP LTE-A standard has defined a PDSCH RE Mapping and Quasi-Co-Location Indicator (PQI) in DCI format 2D for transmission mode 10 that is a CoMP method of PDSCH transmission. In detail, the PQI field is defined with a 2-bit size and indicates 4 of total states according to Table 6 below, information indicated by each state is a delay spread and the like. Moreover, the larger-scale properties may include average gain as well.

According to the aforementioned definition, a user equipment cannot assume that the large-scale properties are identical to each other between antenna ports not in the QCL, i.e., NQCL (Non Quasi co-located) antenna ports. In this case, the user equipment should independently perform a tracking procedure to obtain frequency offset, timing offset and the like according to an antenna port.

On the contrary, the user equipment can perform following operations between antenna ports in QCL.

1) The user equipment can identically apply power-delay profile for a radio channel corresponding to a specific antenna port, delay spread, Doppler spectrum and Doppler spread estimation result to a Wiener filter parameter, which is used for estimating a channel for a radio channel corresponding to a different antenna port, and the like.

2) After obtaining time synchronization and frequency synchronization for the specific antenna port, the user equipment can apply identical synchronization to a different antenna port as well.

3) The user equipment can calculate an average value of RSRP (reference signal received power) measurement values of each of the antenna ports in QCL to obtain average gain.

For instance, having received DM-RS based downlink data channel scheduling information (e.g., DCI format 2C) via PDCCH (or E-PDCCH), the user equipment performs channel estimation for PDSCH via a DM-RS sequence indicated by the scheduling information and may be then able to perform data demodulation.

In this case, if a DM-RS antenna port used for demodulating a downlink data channel and a CRS antenna port of a serving cell are in QCL, when the user equipment performs a channel estimation via the DM-RS antenna port, the user equipment can enhance reception capability of the DM-RS based downlink data channel in a manner of applying large-scale properties of a radio channel estimated from a CRS antenna port of the user equipment as it is.

Similarly, if a DM-RS antenna port used for demodulating a downlink data channel and a CSI-RS antenna port of a serving cell are in QCL, when the user equipment perform a channel estimation via the DM-RS antenna port, the user equipment can enhance reception capability of the DM-RS based downlink data channel in a manner of applying large-scale properties of a radio channel estimated from a CSI-RS antenna port of the serving cell as it is.

An LTE system defines that an eNB configures one of QCL type A and QCL type B to a UE via a higher layer signal while a downlink signal is transmitted in a transmission mode 10 as a CoMP mode.

Here, QCL type A indicates that the remaining large-scale properties of antenna ports of CRS, CSI-RS, and DM-RS except for average gain are assumed to be QCL and means that a physical channel and signals are transmitted in the same point.

On the other hand, QCL type B indicates that the remaining large-scale properties of antenna ports of DM-RS and specific indicated CSI-RS are assumed to be QCL. In particular, QCL type B is defined to configure up to four QCL modes per UE through a higher layer message so as to facilitate CoMP transmission such as DPS, JT, etc. and to dynamically configure a QCL mode for receiving a downlink signal among the QCL modes through downlink control information (DCI). This information is defined in qcl-CSI-RS-ConfigNZPId of the parameter set of the PQI field.

DPS transmission when QCL type B is configured will be described in more detail.

First, it is assumed that node #1 including $N_1$ antenna ports transmits CSI-RS resource #1 and node #2 including $N_2$ antenna ports transmits CSI-RS resource #2. In this case, CSI-RS resource #1 is contained in parameter set #1 of the PQI and CSI-RS resource #2 is contained in parameter set #2 of the PQI. Furthermore, an eNB signals parameter set #1 and parameter set #2 to a UE present in common coverage of node #1 and node #2 via a higher layer.

Then an eNB may perform DPS by configuring parameter set #1 using DCI while data (i.e., PDSCH) is transmitted to a corresponding node through node #1 and configuring parameter set #2 while data is transmitted through node #2. In terms of a UE, when the UE is configured with parameter set #1 through the PQI via DCI, it is assumed that CSI-RS resource #1 and a DM-RS are QCL, and when the UE is configured with parameter set #2 through the PQI, it is assumed that CSI-RS resource #2 and DM-RS are QCL.

Next-generation wireless communication systems consider introduction of an active antenna system (AAS). AAS refers to a system configured such that each antenna includes an active element such as an amplifier, distinguished from a conventional passive antenna system in which an amplifier capable of adjusting the phase and amplitude of a signal is separated from an antenna. The AAS does not need a separate cable, a connector, other hardware devices, etc. to connect an amplifier to an antenna since an active antenna is used, and thus the AAS is efficient in terms of energy and cost. Particularly, since the AAS supports electronic beam control per antenna, the AAS enables enhanced MIMO capable of forming an accurate beam pattern or a 3D beam pattern in consideration of beam direction and beam width.

Massive MIMO having a plurality of input/output antennas and a multi-dimensional antenna structure is also considered owing to introduction of an enhanced antenna system such as AAS. For example, when a two-dimensional antenna array is formed, distinguished from a conventional linear type antenna array (or a one-dimensional antenna array), a 3-dimensional beam pattern may be formed by an active antenna of an active antenna system.

Figure 12:
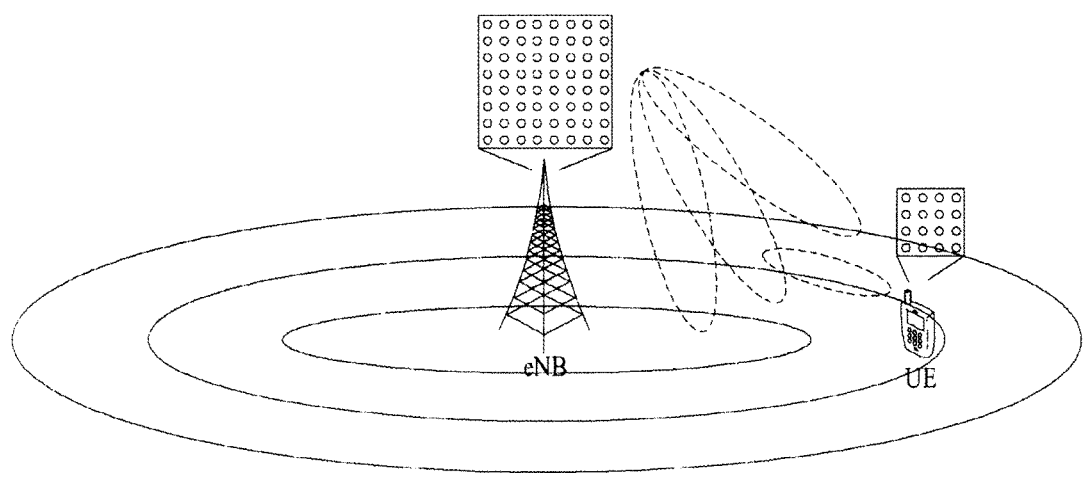
FIG. 12 illustrates a concept of massive MIMO technology.

FIG. 12 illustrates a concept of massive MIMO technology. In particular, FIG. 12 illustrates a system in which an eNB or a UE has a plurality of transmit/receive antennas capable of forming an active antenna system-based 3D beam.

Referring to FIG. 12, from the viewpoint of a transmit antenna, when a 3D beam pattern is used, a beam may be semi-statically or dynamically formed in a vertical direction as well as in a horizontal direction of the beam, and application of forming of a vertical direction of sector may be considered. From the viewpoint of a receive antenna, a signal power increase due to an antenna array gain can be expected when a reception beam is formed using a large-scale receive antenna.

Accordingly, an eNB can receive a signal transmitted from a UE through a plurality of antennas on uplink and the UE can set transmit power thereof to a very low level in consideration of the gain of the large-scale receive antenna in order to reduce the influence of interference.

Hereinafter, UE capability signaling will be described. An LTE system introduces a carrier aggregation (CA) scheme as a representative example in order to enhance capability. UEs need to support the CA scheme and can be variously classified into a UE with high level capability and low level capability according to a supporting degree. In order to notify an eNB about a degree of UE capability, 3GPP standard document defines various fields as well as UE categories in a UE-EUTRA capability information element. In particular, the 3GPP standard document defines the number of CSI processes supported for each a frequency band or carrier supported by the UE so as to include information shown in Table 7 below.

TABLE 7

```
...
BandParameters-v113D ::= SEQUENCE {
    supportedCSI-Proc-r11        ENUMERATED {n1, n3, n4}
}
...
```

The 3GPP standard document introduces a concept of a CSI process including a combination of one NZP CSI-RS resource for signal measurement and one CSI-IM resource for interference measurement in order to feedback CSI of a UE. In addition, the UE may transmit UE capability signaling including the maximum number P of supportable CSI processes of the UE to an eNB and transmit one of P=1, P=3, and P=4 to the eNB, which are indicated by n1, n3, and n4 in Table 7 above, respectively.

A UE that transmits P=1 as UE capability may notify an eNB that only a single CSI process can be processed, and in spite of transmission mode 10, a DPS operation may be impossible and an effect of enhancing the accuracy of interference measurement through use of CSI-IM may be mainly expected. A UE that transmits P=3 or P=4 as UE capability may notify an eNB that a multiple CSI process can be configured, and the UE can receive a CSI process information element from a higher layer and perform CSI feedback for each CSI process to perform an DPS operation.

According to the current standard document, up to three NZP CSI-RS resources may be configured, but when a UE signals P=1 as UE capability information (this UE will be referred to as a P1-UE), in the case of the P1-UE, an eNB may configure only one NZP CSI-RS. However, according to the current standard document, the case in which the P1-UE is configured with a plurality of NZP CSI-RS resources cannot be excluded. According to the present invention, required operations of a UE and an eNB in consideration of this case will be described below.

First, with regard to the P1-UE, a UE operation in which two or more NZP CSI-RS resource configuration is not expected to be received may be defined. When the P1-UE receives the two or more NZP CSI-RS resource configuration, this is processed as error. In more detail, the P1-UE may be configured with only CSI process index #0, and the NZP CSI-RS may be configured with only NZP CSI-RS resource index #0. Although the CSI-IM may be limited to be configured with only CSI-IM resource index #0, the CSI-IM may be determined to be configured with up to four CSI-IM resources, distinguished from the NZP CSI-RS.

As a result, the P1-UE may be configured with only CSI process index #0 including information of a combination of {NZP CSI-RS resource index #0 and CSI-IM resource index #i}. When other index information items in addition to NZP CSI-RS resource index #0 are contained in CSI process index #0, this may be processed as error, or even if any NZP CSI-RS resource index information is signaled, the P1-UE may be defined to apply the NZP CSI-RS resource index information as NZP CSI-RS resource index #0. Alternatively, the P1-UE may be defined to delete a portion of an NZP CSI-RS resource index from CSI process index and to always apply the portion as NZP CSI-RS resource index #0.

When only one CSI-IM resource is limited to be configurable, CSI-IM resource index #0 may be limited to be always configured as CSI process index #0 or when other CSI-IM resource index #i is included, this case may be processed as error. Alternatively, even if any CSI-IM resource index information is signaled, the P1-UE may apply CSI-IM resource index #0. Alternatively, CSI-IM information may be deleted from CSI process index #0 and the P1-UE may be defined to always apply CSI-IM resource index #0.

From the viewpoint of RRC signaling as higher layer signaling, (1) CSI process configuration, (2) NZP CSI-RS resource, and (3) CSI-IM resource may be defined to be transmitted through a separate RRC message. In other words, in order to reconfigure all or at least two of the information items of (1) to (3), each configuration is reconfigured through a separate RRC message, it is not always ensured to simultaneously change the two or more configuration at the same time. Accordingly, according to the present invention, a method in which even a P1-UE is intentionally configured with two or more NZP CSI-RS resources and/or two or more CSI-IM resources may be configured. That is, like in the aforementioned example, a method of using two or more NZP CSI-RS resources or two or more CSI-IM resources by even a P1-UE instead of processing these as error when the two or more NZP CSI-RS resources or the two or more CSI-IM resources are configured.

That is, the eNB may configure a plurality of NZP CSI-RS resources representing two or more TPs with highest radio channel gain to a specific P1-UE. Hereinafter, for convenience of description, it is assumed that two of NZP CSI-RS #1 and NZP CSI-RS #2 are configured. In addition, two or more influential CSI-IM resource configurations may be intentionally pre-configured so as to assume the CSI-IM resource configurations during CQI calculation to the corresponding P1-UE. Similarly, for convenience of description, it is assumed that two of CSI-IM #1 and CSI-IM #2 are configured.

In this case, a single CSI process may be configured to the corresponding P1-UE, and in this case, a combination of {NZP CSI-RS #1 and CSI-IM #1} may be configured as configuration information. In this case, the corresponding P1-UE may calculate and report RI/PMI/CQI as CSI feedback content through CSI-RS #1 and CSI-IM #1. Then, owing to movement of the corresponding P1-UE and/or time-varying radio channel environment, in order to report radio channel-based CSI feedback from NZP CSI-RS #2 and CSI-IM #2, only CSI process index 0 configuration information corresponding to the resource of (1) may be re-configured as a combination of {NZP CSI-RS #2 and CSI-IM #2} without the need to reconfiguration of the resources of (2) and (3). This operation is advantageous to minimize a number of times of RRC reconfiguration of the information of (1), (2), and (3). Hereinafter, the above operation will be described in more detail.

Only a NZP CSI-RS resource index indicated in a single CSI process configured to the corresponding P1-UE may be configured in all PQI parameter sets configured to the P1-UE. For example, when configuration information of a single CSI process configured to the P1-UE contains a combination of {NZP CSI-RS #1 and CSI-IM #1}, qcl-CSI-RS-ConfigNZPId-r11 associated for each PQI parameter set needs to be only NZP CSI-RS #1. That is, when CSI-RS information for QCL assumption of information of a specific PQI parameter set is configured as other information that is not CSI-RS #1, the P1-UE may process this as error, or even if any NZP CSI-RS resource index is transmitted, the P1-UE may always use NZP CSI-RS #1 as CSI-RS information for QCL assumption. Alternatively, a portion of an NZP CSI-RS resource index in the corresponding PQI parameter set may be deleted, and the P1-UE may always use a NZP CSI-RS resource indicated by a single CSI process, that is, CSI-RS information for QCL assumption.

Generally describing the present invention, the P1-UE may be configured with a plurality of NZP CSI-RSs but may be determined with only one CSI process. That is, the P1-UE may be configured with a plurality of NZP CSI-RSs but configured with only one CSI process.

In addition, the P1-UE assumes that only a lastly configured CSI process is effective. That is, when a CSI process is reconfigured or configuration information is received many times, the P1-UE also always recognizes that only a lastly (last) configured CSI process is effective during an operation. Accordingly, other CSI process information items may be disregarded. In this case, when the effective CSI process is connected to NZP CSI-RS #A, the P1-UE expects to be determined with only PQI connected to NZP CSI-RS #A. In other words, the corresponding P1-UE does not necessarily receive a PDSCH determined as PQI that is not connected to NZP CSI-RS #A.

That is, even if the P1-UE is configured with a specific PQI parameter set connected with another NZP CSI-RS #B, the P1-UE may assume that there is no case in which downlink grant is transmitted based on the PQI parameter set, and even if downlink grant is received, the P1-UE may process the downlink grant as error. Upon receiving downlink grant based on a specific PQI parameter set connected to NZP CSI-RS #B, the UE may disregard the downlink grant and may not receive the corresponding PDSCH, and accordingly, may disregard all operations associated with ACK/NACK transmission to the downlink grant. From the viewpoint of an eNB, there is restriction in that downlink grant needs to be always transmitted in the form of indicating a specific PQI parameter set among PQI parameter sets connected specific NZP CSI-RS #A connected to an effective CSI process.

In addition, when the effective CSI process is connected to NZP CSI-RS #A, if EPDCCH sets configured to the P1-UE is present, it is expected that a PQI parameter set that is semi-statically configured for each EPDCCH set is configured to be connected to only NZP CSI-RS #A. In other words, when a PQI parameter set that is not connected to NZP CSI-RS #A is semi-statically configured to a specific EPDCCH set, the P1-UE does not necessarily receive an EPDCCH detected from the corresponding EPDCCH set.

In addition, like the P1-UE, when a UE configures P as 1 with respect to a specific band, if a duplex mode of the corresponding band corresponds to an FDD method, the aforementioned methods, for example, a method of configuring only one NZP CSI-RS, and a method of recognizing only a PQI parameter set including only NZP CSI-RS belonging to the effective CSI process among PQI parameter sets may be defined to be applied. On the other hand, when the duplex mode of the corresponding band corresponds to a TDD method, the above methods may be defined not to be applied. That is, with regard to a TDD system, even if single feedback is achieved via one CSI process, a plurality of NZP CSI-RSs may be configured such that different PQI parameter sets are indicated by a plurality of transmission points during reception of DM-RS-based PDSCH.

The TDD system will now be described in more detail. Since an eNB can estimate separate radio channel information items about different transmission points via SRS transmission of a UE, the eNB may configure a UE to measure an environment for muting a plurality of TPs in consideration of CSI-IM resource configuration, and thus the eNB may be reported with an interference estimation value based on the corresponding CSI-IM from the UE and may also apply DPS transmission to the P1-UE.

In this case, since the P1-UE is configured with only one CSI process, complexity of up to one CSI process is present as complexity for calculation of CSI feedback. However, like in the above example, since a plurality of different PQI parameter sets configured with different NZP CSI-RSs is dynamically indicated during reception of DM-RS-based PDSCH, large-scale properties from the corresponding radio channel need to be long-term estimated or tracked for NZP CSI-RS configured for each of a plurality of PQI parameter sets to be configured to the corresponding UE.

Alternatively, in order to ensure complexity of CSI calculation of the P1-UE with a predetermined level or less, the P1-UE may be defined to estimate or track only large-scale properties of a radio channel from one specific NZP CSI-RS. This does not mean that only large-scale properties of a radio channel from NZP CSI-RS #A belonging to an effective CSI process need to be estimated or tracked but means that only large-scale properties from a radio channel from one specific NZP CSI-RS with a maximum number as well as NZP CSI-RS #B and NZP CSI-RS #C may be estimated or tracked. When NZP CSI-RS #A is configured for the effective CSI process, specific one NZP CSI-RS may be defined to configure NZP CSI-RS #A to all PQI parameter sets configured to the corresponding P1-UE in the same way.

The present invention proposes a CSI process configuration method for a CoMP JT operation as follows.

As described above, the current 3GPP standard document defines that one CSI process includes a combination of only one NZP CSI-RS and only one CSI-IM. This has restriction in that a JT operation from different transmission points cannot be smoothly supported. Accordingly, the present invention proposes an enhanced CSI process configuration method to facilitate CSI process that is more appropriate for JT.

First, the case in which a specific CSI process includes information of a combination of {two or more NZP CSI-RS resource indexes and at least one CSI-IM resource index} is considered. In addition, the specific CSI process may include CSI information between transmission points and a value of "the ratio of PDSCH EPRE to CSI-RS EPRE (Pc)" corresponding to each NZP CSI-RS resource index. Upon receiving the CSI process configuration, the UE may report periodic-CSI (P-CSI) or aperiodic-CSI (A-CSI) to the corresponding CSI process.

For example, two NZP CSI-RSs and two Pc values of NZP CSI-RS #1 (and Pc1 associated therewith) and NZP CSI-RS #2 (and Pc2 associated therewith) are configured in a specific CSI process and CSI information of one transmission point and one CSI-IM configuration are contained in the specific CSI process, if a UE calculates feedback content, the UE may calculate optimum PMI1 for a radio channel estimated from NZP CSI-RS #1 and optimum PMI2 for a radio channel estimated from NZP CSI-RS #2 and may also calculate and feedback CSI information of an optimum transmission point for connection between PMI1 and PMI2.

In this case, RI may be determined to feedback one common RI value that is commonly applied to PMI1 and PMI2. CQI may be calculated by assuming the JT operation and considering Pc1 and Pc2.

In the case of A-CSI report, the aforementioned feedback contents may be reported via specific DCI triggering at one time. In the case of P-CSI report, in order to effectively report the aforementioned feedback, a new feedback type may be defined such that P-CSI configuration of one CSI process is configured with one P-CSI feedback chain of RI, PMI1, PMI2 CSI of a transmission point, and CQI.

Representatively, a feedback type of CSI of transmission point may be further defined for joint encoding with RI, and since PMI1 and PMI2 use a conventional PMI report period, the number of PMIs to be reported is doubled, and thus reporting instances for transmission of the PMIs may be doubled by as much as the increase. That is, the CSI feedback chain may be configured such that PMI1, PMI2, and CQI have divided transmission periods by correcting a conventional form in which PMI and CQI have divided transmission period in an RI period. Alternatively, an additional feedback type may be defined so as to transmit one reporting instance for PMI1 and PMI2 is transmitted in a multiplexing form. In this case, each of PMI1 and PMI2 may be defined such that only a preset PMI is used in a conventional codebook in order to reduce a feedback size.

For feedback for the aforementioned JT operation, a specific CSI process may be defined to be subdivided in units of a plurality of sub-CSI processes. For example, sub-CSI process #1 and sub-CSI process #2 may be configured in a specific CSI process, a combination of {NZP CSI-RS #1 (and Pc1 associated therewith) and CSI-IM #1} may be configured in sub-CSI process #1, a combination of {NZP CSI-RS #2 (and Pc2 associated therewith) and CSI-IM #2} may be configured in sub-CSI process #2, and CSI information of one transmission point may be further and commonly configured in the corresponding CSI process.

Likewise, when specific CSI process configuration including a plurality of sub-CSI process configurations is transmitted to a UE, P-CSI configuration may be provided to each sub-CSI process. Even if conventional P-CSI feedback configuration is provided to each sub-CSI process, sub-CSI processes belong to a specific CSI process of a higher layer thereof, and thus a UE has a restriction of RI, CSI between transmission points, and CQI for all of the aforementioned sub-CSI processes during calculation of feedback content for each corresponding sub-CSI process.

For example, the UE may report optimum PMI1 and RI and CQI for a radio channel estimated from NZP CSI-RS #1 as feedback content for sub-CSI process #1 and report optimum PMI2 and RI and CQI for a radio channel estimated from NZP CSI-RS #2 as feedback content for sub-CSI process #2. In this case, CSI information between optimum transmission points for connection between PMI1 and PMI2 may be pre-defined to be reported together during CSI report of a specific sub-CSI process or a sub-CSI process of which CSI report is reported together via RRC signaling may be configured.

In addition, RI may be reported for each sub-CSI process but may be configured as only the same value. Alternatively, RI may be defined to report other contents so as to report the common RI only for one sub-CSI process and to report CSI information between the transmission points for other sub-CSI processes.

In addition, CQI may be defined to report other contents so as to report CQI that assumes a JT operation as the same value for FB for the sub-CSI process #1 and FB for sub-CSI process #2, to report CQI that assumes a JT operation for only one sub-CSI process and to report CSI information between the transmission points for other sub-CSI processes.

In the case of A-CSI report, all feedback contents for the aforementioned JT operation may be reported at one time via triggering of a specific DCI.

In addition, in a method of configuring two or more NZP CSI-RS resource indexes in a specific CSI process, QCL assumption may be defined to be always satisfied between CSI-RS resource indexes, that is, between corresponding CSI-RS antenna ports. Representatively, the method may be used to contain two or more NZP CSI-RS configurations geographically present in the same area or having the same QCL properties in one CSI process and to receive the configurations from a UE as feedback. For example, the method may be used to apply 3D beamforming or 3D-MIMO method from an eNB having the antenna structure illustrated in FIG. 12.

For example, it is necessary to configure a specific NZP CSI-RS #1 representing a horizontal direction and another specific NZP CSI-RS #2 representing a vertical direction in the same area and to allow the UE to report feedback for 3D-MIMO. In this case, since all corresponding CSI-RS #1 and CSI-RS #2 are configured for the same eNB, it is obvious that QCL assumption between CSI-RS #1 and CSI-RS #2 is possible. Accordingly, CRS information items to be configured as CRS information for additional QCL assumption may also be configured as the same value of CRS information of a corresponding serving cell or a specific cell for each of CSI-RS #1 and CSI-RS #2.

For example, when a UE is configured with a specific CSI process including NZP CSI-RS #1 and NZP CSI-RS #2, QCL assumption between NZP CSI-RS #1 and NZP CSI-RS #2 is always possible. That is, an estimated value of large-scale properties of a radio channel of NZP CSI-RS #1 may be shared with an estimated value of large-scale properties of a radio channel from NZP CSI-RS #2. Accordingly, restriction may be imposed in that CRS1 information for specific QCL assumption to be configured in NZP CSI-RS #1 and CRS CRS2 information for specific QCL assumption to be configured in NZP CSI-RS #2 are always equal.

In other words, physical cell ID (PCI)1 for generating a CRS1 sequence having a value of 0 to 503 and PCI2 for generating a CRS2 sequence need to be configured to be always equal. When CRS1 for QCL assumption configured in NZP CSI-RS #1 included in the specific CSI process and CRS2 information for QCL assumption configured in NZP CSI-RS #1 are different, the UE may process this as error. From the viewpoint of an eNB, there is a restriction in that NZP CSI-RSs in which QCL assumption is not possible cannot be included in a specific CSI process index.

In addition, CSI feedback between the transmission points may be determined to be configured for only NZP CSI-RSs in which QCL assumption can be applied, such as NZP CSI-RS #1 and NZP CSI-RS #2. That is, when NZP CSI-RS #1 and NZP CSI-RS #2 in which QCL assumption is possible are configured in a specific CSI process, CSI feedback of the UE to NZP CSI-RS #1 and NZP CSI-RS #2 may be reported as feedback content for the aforementioned JT operation, and in this case, CSI between transmission points may be fed back together. When QCL assumption is not satisfied between NZP CSI-RS #1 and NZP CSI-RS #2, CSI feedback between transmission points may be determined not to be reported.

The methods proposed by the present invention may be restrictedly applied only to the case in which a specific transmission mode is configured to the UE or the methods according to the present invention are enabled via specific RRC signaling. That is, the methods may be restrictedly applied only in the environment of FIG. 12.

Figure 13:
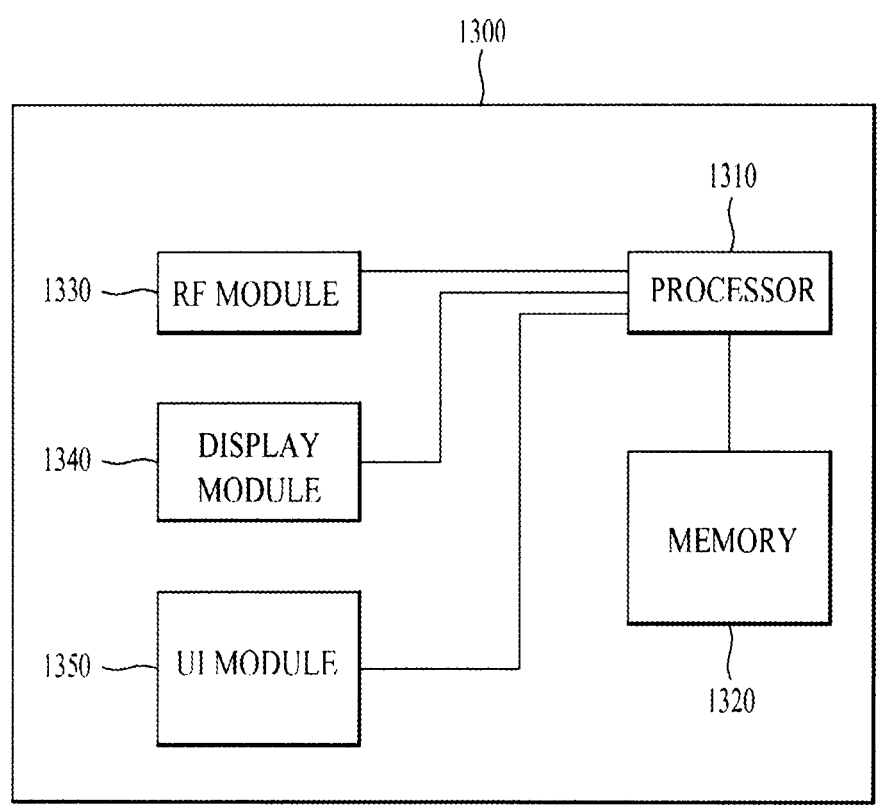
FIG. 13 is a block diagram for an example of a communication device according to one embodiment of the present invention.

FIG. 13 is a block diagram for an example of a communication device according to one embodiment of the present invention.

Referring to FIG. 13, a communication device 1300 may include a processor 1310, a memory 1320, an RF module 1330, a display module 1340, and a user interface module 1350.

Since the communication device 1300 is depicted for clarity of description, prescribed module(s) may be omitted in part. The communication device 1300 may further include necessary module(s). And, a prescribed module of the communication device 1300 may be divided into subdivided modules. A processor 1310 is configured to perform an operation according to the embodiments of the present invention illustrated with reference to drawings. In particular, the detailed operation of the processor 1310 may refer to the former contents described with reference to FIG. 1 to FIG. 12.

The memory 1320 is connected with the processor 1310 and stores an operating system, applications, program codes, data, and the like. The RF module 1330 is connected with the processor 1310 and then performs a function of converting a baseband signal to a radio signal or a function of converting a radio signal to a baseband signal. To this end, the RF module 1330 performs an analog conversion, amplification, a filtering, and a frequency up conversion, or performs processes inverse to the former processes. The display module 1340 is connected with the processor 1310 and displays various kinds of informations. And, the display module 1340 can be implemented using such a well-known component as an LCD (liquid crystal display), an LED (light emitting diode), an OLED (organic light emitting diode) display and the like, by which the present invention may be non-limited. The user interface module 1350 is connected with the processor 1310 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although an example of applying a method and apparatus for configuring a reference signal in a multi-cell-based wireless communication system to a 3GPP LTE system is described, the present invention is applicable to various wireless communication systems in addition to the 3GPP LTE system.

The invention claimed is:

1. A method for receiving a channel status information (CSI) feedback from a user equipment (UE) at a base station (BS) in a wireless communication system, the method comprising:
    transmitting information on a CSI process via a radio resource control (RRC) layer to the UE; and
    receiving the CSI feedback for the CSI process from the UE,
    wherein the CSI process comprises a specific number of channel measurement resources and a specific number of interference measurement resources having a one to one linkage with the specific number of channel measurement resources,
    wherein the CSI feedback for the CSI process is generated based on one channel measurement resource of the specific number of channel measurement resources and one interference measurement resource corresponding to the one channel measurement resource of the specific number of interference measurement resources,
    wherein the CSI process comprises a specific number of parameters having a one to one linkage with the specific number of channel measurement resources, each of the specific number of parameters indicating a transmission power of a data channel to corresponding channel measurement resource.

2. The method of claim 1, wherein the reference signals corresponding to the specific number of channel measurement resources are quasi co-located.

3. The method of claim 1, wherein the channel measurement resources are defined by CSI-RS (channel status information-reference signal) resource element configuration with non-zero transmission power and the interference measurement resources are defined by the CSI-RS resource element configuration with zero transmission power.

4. The method of claim 1, wherein reference signals corresponding to the channel measurement resources are beamformed differently from each other.

5. A base station in a wireless communication system, the BS comprising:

a radio frequency (RF) unit; and a processor that controls the RF unit to:

transmit information on a CSI process via a radio resource control (RRC) layer to a user equipment (UE), and receive the CSI feedback for the CSI process from the UE, wherein the CSI process comprises a specific number of channel measurement resources and Ma a specific number of interference measurement resources having a one to one linkage with the specific number of channel measurement resources, wherein the CSI feedback for the CSI process is generated based on one channel measurement resource of the specific number of channel measurement resources and one interference measurement resource corresponding to the one channel measurement resource of the specific number of interference measurement resources, wherein the CSI process comprises a specific number of parameters having a one to one linkage with the specific number of channel measurement resources, each of the specific number of parameters indicating a transmission power ratio of a data channel to corresponding channel measurement resource.

6. The BS of claim 5, wherein the reference signals corresponding to the specific number of channel measurement resources are quasi co-located.

7. The BS of claim 5, wherein the channel measurement resources are defined by CSI-RS (channel status information-reference signal) resource element configuration with non-zero transmission power and the interference measurement resources are defined by the CSI-RS resource element configuration with zero transmission power.

8. The BS of claim 5, wherein reference signals corresponding to the channel measurement resources are beamformed differently from each other.

* * * * *